Patented Mar. 29, 1938

2,112,319

UNITED STATES PATENT OFFICE 2,112,319

PRODUCTION OF NEW DECYLENE GLYCOLS

Jacob N. Wickert, Charleston, W. Va., assignor, by mesne assignments, to Union Carbide and Carbon Corporation, a corporation of New York No Drawing. Application May 3, 1934, Serial No. 723,799

10 Claims. (Cl. 260—156.5)

The present invention relates to the production of new decylene compounds, and more especially it concerns a new ten carbon atom aldol, and the corresponding decylene glycol, as well as aliphatic and aromatic esters of this glycol. It likewise embraces a method for the production of these compounds.

The aldol and the glycol produced in the practice of the invention are valuable starting materials for many organic syntheses; while the decylene glycol esters, such as decylene glycol diacetate, are valuable as high-boiling solvents and plasticizers in lacquers and other coating and impregnating compositions.

In the preferred practice of the invention, ethylhexaldehyde and acetaldehyde are condensed at low temperatures, generally around —5° C. to +5° C., in the presence of an alkaline compound such as caustic soda. The reaction mixture is then neutralized with a dilute acid or its equivalent. The neutralized reaction mixture preferably is filtered to remove inorganic salts, and is distilled under vacuum at temperatures not substantially higher than 80° C., for removal of unreacted starting materials and for concentration of the aldols present in the mixture.

The residual liquid mixture is then hydrogenated under superatmospheric pressure, preferably in the liquid phase, in the presence of an active hydrogenating catalyst, such as active nickel. The aldehyde group of the aldol thus is hydrogenated to yield a substituted 1,3-butylene glycol having ten carbon atoms in its structure.

The hydrogenation reaction mixture is filtered to remove the catalyst, and the filtrate is fractionally distilled under vacuum. The fraction distilling at around 132° to 137° C. at 9 mm. absolute pressure contains the 10-carbon 1,3-decylene glycol.

This decylene glycol may then be esterified with an excess of an esterifying agent, such as an aliphatic acid or anhydride, or mixtures thereof, in the presence of an esterification catalyst. Where acetic acid is the esterifying agent employed, there is produced a stable decylene glycol diacetate which possesses properties rendering it highly useful in coating, impregnating, and molding compositions as a high-boiling solvent and plasticizer.

The hydrogenation of the aldol is effected under superatmospheric pressures up to 100 atmospheres and at temperatures within the range from 20° to 200° C., and preferably around 55° to 60° C. Pressures of around 700 to 1000 pounds per square inch gauge are quite effective for this hydrogenation step.

The following example will serve to illustrate the invention in accordance with a preferred modification thereof. All proportions are given in parts by weight unless otherwise indicated:

To a mixture of 60 parts of 2 ethylhexaldehyde and 30 parts of acetaldehyde cooled to —5° C. were gradually added 2 parts of caustic soda dissolved in 2 parts of water and an equal weight of methanol. The rate of addition was such that the temperature did not exceed —3° C. The resulting reaction may be indicated by the following equation:

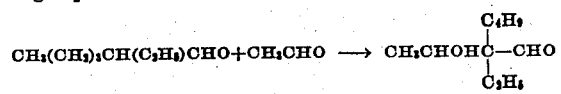

After a 20-hour reaction period at the last-named temperature with constant agitation, the reaction mixture was rendered just neutral to phenolphthalein by a 30% aqueous sulphuric acid solution. The inorganic salt (sodium sulphate) which separated was filtered off. The clear filtrate had a specific gravity at 20° C. of .950. It was stripped of unreacted starting materials by distilling it under subatmospheric pressures ranging from 100 mm. to 5 mm. of mercury, and temperatures ranging from 20° to 80° C.

The stripped mixture containing the decyl aldol was mixed with around 5% of active nickel catalyst and was then hydrogenated while under a gauge pressure ranging from 700 to 900 pounds per square inch, at temperatures ranging from 20° to 60° C. The hydrogenation was continued for 16 hours, until no further absorption of hydrogen occurred under the conditions named. The reaction mixture was filtered to remove the catalyst; and the clear filtrate therefrom was fractionally distilled under subatmospheric pressure. After the removal of a heads cut and certain midcuts, a fraction of substantial volume which boiled at 132° to 137° C. at 9 mm. absolute pressure was separately recovered. This fraction had a specific gravity at 20° C. of .943. Molecular weight and acetyl number determinations showed it to be a decylene glycol. It appears to have the structure corresponding to the formula:

2,2-ethylbutyl-1,3-butylene glycol,

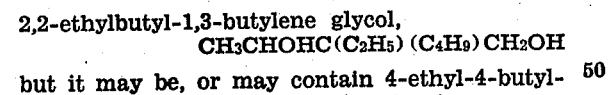

but it may be, or may contain 4-ethyl-4-butyl-1,3-butylene glycol having the structure:

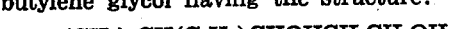

depending upon the order of condensation of the aldehydes. It may be a mixture of these glycols in certain instances.

The decylene glycol was esterfied in a still provided with a bead-packed rectifying column equipped with a condenser and a separator. To a mixture of 300 grams of the decylene glycol and 230 grams of glacial acetic acid was added 1 cc. of concentrated (98%) sulphuric acid, and the mixture was reacted and distilled. The esterification reaction is represented by the equation:

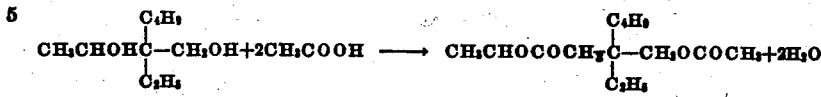

(2,2-ethylbutyl-1,3-butylene glycol diacetate)

The evolved vapors were condensed, and they formed a two-phase condensate in the separator. The upper layer was returned to the still as long as two layers formed in the separator; and the heavier (water) layer was removed as formed, or at frequent intervals.

When evolution of water had ceased, the residual liquid was cooled and was washed with dilute aqueous sodium carbonate solution to free it of unreacted acetic acid. The washed product was then distilled under vacuum. After a small heads cut, the glycol ester fraction was secured boiling at 130° to 135° C. at 5 mm. absolute pressure, and at 265° C. at atmospheric pressure. Its specific gravity at 20° C. was .975. Tests conducted upon dry films of vinyl resins containing this ester, which were formed from solutions containing the resins and ester in a standard solvent mixture, have demonstrated the suitability of the ester for plasticizing and solvent purposes in the lacquer, varnish, and resin-molding industries.

It is within the scope of the invention to produce other esters of 1,3-decylene glycol in addition to the diacetate specifically mentioned above, as for example by substituting for the glacial acetic acid in the above example, an excess of some other acid, such as formic acid, propionic acid, stearic acid, salicylic acid, or phthalic acid, or their anhydrides, in the presence of an acid or acidic esterification catalyst, such as concentrated sulphuric acid, toluene sulfonic acid, or phosphoric acid.

By the practice of the invention there are produced esterification products of 1,3-decylene glycols with one or more aliphatic or aromatic acids, or mixtures thereof, the said esters having at least one and preferably two alkyl radicals in one or more side chains. These esters may be represented by the formula:

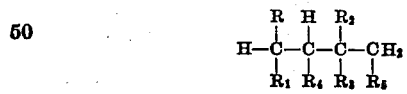

in which R and $R_1$ respectively are ethyl and butyl radicals, or are hydrogen; $R_2$ and $R_3$ respectively are ethyl and butyl radicals or are hydrogen; and $R_4$ and $R_5$ represent respectively the same or different aliphatic or aromatic acid radicals. At least two of the groups R, $R_1$, $R_2$, and $R_3$ are hydrogen.

The invention is susceptible of modification within the scope of the appended claims.

I claim:

1. As a chemical compound, a 1,3-glycol having ten carbon atoms in its molecule, and having a boiling range of from 132° to 137° C. at 9 mm. of mercury absolute pressure, and a specific gravity at 20° C. of .943.

2. As a chemical, an ethyl butyl substituted 1,3-butylene glycol of ten carbon atoms and having a boiling range of from 132° to 137° C. at 9 mm. of mercury absolute pressure, and a specific gravity at 20° C. of .943.

3. In the process of making a decylene glycol, the steps which comprise condensing 2-ethylhexaldehyde and acetaldehyde, and hydrogenating the resultant aldol under superatmospheric pressure at an elevated temperature not substantially higher than 200° C., distilling the hydrogenated mixture under vacuum, and separately recovering the fraction boiling between 132° and 137° C. at 9 mm. absolute pressure.

4. In the process of making a decylene glycol, the steps which comprise condensing 2-ethylhexaldehyde and acetaldehyde, thereby forming a decylene aldol, distilling the resultant reaction mixture under subatmospheric pressure for stripping the latter of unreacted aldehydes, hydrogenating the stripped mixture under superatmospheric pressure and at elevated temperatures not substantially higher than 200° C., distilling the hydrogenated mixture, and separately recovering the fraction boiling between 132° and 137° C. at 9 mm. of mercury absolute pressure.

5. The process which comprises condensing 2-ethylhexaldehyde with acetaldehyde in the presence of an alkaline compound, neutralizing the resultant reaction mixture, removing inorganic salts and unreacted starting materials therefrom, hydrogenating the remainder of the said reaction mixture under superatmospheric pressure and at temperatures within the range from around 20° to around 200° C., distilling the hydrogenated mixture, and separating the fraction distilling at from around 132° to around 137° C. at 9 mm. of mercury absolute pressure.

6. The process which comprises condensing 2-ethylhexaldehyde with acetaldehyde in the presence of an alkaline compound, neutralizing the resultant reaction mixture, removing inorganic salts and unreacted starting materials therefrom, hydrogenating the remainder of the said reaction mixture under superatmospheric pressure and at an elevated temperature within the range up to around 60° C., distilling the hydrogenated mixture, and separating the fraction distilling at from around 132° to around 137° C. at 9 mm. of mercury absolute pressure.

7. As a chemical compound, a 1,3-decylene glycol having two dissimilar alkyl radicals in side chains in its molecular structure, the said compound having a composition represented by the formula $CHRR_1CHOHCR_2R_3CH_2OH$, wherein R and $R_1$ respectively represent ethyl and butyl radicals or both are hydrogen, and wherein $R_2$ and $R_3$ respectively represent ethyl and butyl radicals or both are hydrogen.

8. As a chemical compound, a 1,3-decylene glycol having two dissimilar alkyl radicals in side chains in its molecular structure directly connected with the same carbon atom of the carbon chain, the said compound having a composition represented by the formula $CHRR_1CHOHCR_2R_3CH_2OH$, wherein R and $R_1$ respectively represent ethyl and butyl radicals or both are hydrogen, and wherein $R_2$ and $R_3$ respectively represent ethyl and butyl radicals or both are hydrogen.

9. The process of making a 1,3-decylene glycol, which comprises condensing 2-ethylhexaldehyde with acetaldehyde in the presence of an alkaline compound, neutralizing the resultant reaction mixture, and hydrogenating the decyl aldol thus produced.

10. The process of making a 1,3-decylene glycol, which comprises condensing 2-ethylhexaldehyde with acetaldehyde in the presence of an alkaline compound, neutralizing the resultant reaction mixture, hydrogenating the decyl aldol thus produced at an elevated temperature and under super-atmospheric pressure, and separating from the hydrogenation reaction mixture the resultant 1,3-decylene glycol.

JACOB N. WICKERT.